United States Patent
Pergande

(12) Patent No.: US 6,466,710 B1
(45) Date of Patent: Oct. 15, 2002

(54) PASSIVE IDENTIFICATION FRIEND OR FOE (IFF) SYSTEM

(75) Inventor: Al Pergande, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/986,186

(22) Filed: Nov. 7, 2001

(51) Int. Cl.[7] ............................. G02B 6/26; G02B 6/42
(52) U.S. Cl. ............................. 385/15; 385/18; 385/31; 385/37; 385/33; 372/18; 372/11
(58) Field of Search ....................... 385/15, 31, 36, 385/37, 33, 123, 17, 18; 359/341.1, 341.2; 372/18, 11

(56) References Cited

U.S. PATENT DOCUMENTS

| | | | | |
|---|---|---|---|---|
| 4,249,265 A | | 2/1981 | Coester | 455/604 |
| 4,494,873 A | * | 1/1985 | Perlmutter et al. | 356/467 |
| 4,763,361 A | | 8/1988 | Honeycutt et al. | 455/605 |
| 5,355,241 A | | 10/1994 | Kelley | 359/170 |
| 5,375,008 A | | 12/1994 | Guerreri | 359/169 |
| 5,422,645 A | | 6/1995 | Nettleton et al. | 342/45 |
| 5,459,470 A | | 10/1995 | Wootton et al. | 342/45 |
| 5,539,565 A | | 7/1996 | Waddoups et al. | 359/170 |
| 5,583,507 A | | 12/1996 | D'Isepo et al. | 342/45 |
| 5,651,018 A | * | 7/1997 | Mehuys et al. | 372/102 |
| 5,666,373 A | * | 9/1997 | Sharp et al. | 372/108 |
| 5,802,084 A | * | 9/1998 | Bowers et al. | 372/18 |
| 5,819,164 A | | 10/1998 | Sun et al. | 455/106 |
| 5,870,215 A | | 2/1999 | Milano et al. | 359/172 |

OTHER PUBLICATIONS

Cleartran®, from Website on Mar. 9, 2000, 7 pages.

* cited by examiner

*Primary Examiner*—Brian Healy
*Assistant Examiner*—Daniel Valencia
(74) *Attorney, Agent, or Firm*—Burns, Doane, Swecker & Mathis, LLP

(57) ABSTRACT

A system is provided for passively producing at least two distinct signal patterns. The system can be used for passively identifying friend or foe in an environment and operates in a hyper spectral mode that accommodates multiple bands simultaneously. Exemplary embodiments receive radiated energy within a resonant cavity, and use an absorber and a reflector to absorb and reflect desired frequencies of the incoming energy. A controller is connected to the IFF system and controls the switching back and forth between the absorber and the reflector to produce a signal having a desired data format. The encoded data can be used to determine the status of the candidate target.

13 Claims, 3 Drawing Sheets

PASSIVE IDENTIFICATION FRIEND OR FOE (IFF) SYSTEM

BACKGROUND OF THE INVENTION

1. Field of the Invention

The present invention relates to an apparatus for passively producing at least two distinct signal patterns for use, for example, in an identification of friend or foe (IFF) system to determine the friendly or unfriendly status of a potential target, adversary, or entity.

2. Background of Invention

Apparatus are known for producing distinct signal patterns. For example, in military applications, it is often desired to make an IFF determination, so that command authority can take an appropriate response. For commercial applications, an IFF can be used to identify objects with which it is desired to establish communications or otherwise interact. In addition to locating an object, the IFF's ability to discriminate between friendly and unfriendly units can help manage and coordinate their deployment in a theater of operations.

Such a device should be able to identify objects quickly and reliably over a broad frequency range. It is useful to perform this identification process in a passive mode, so that no active radiation or energy is generated and emitted that can betray the device or its position to any undesired entity.

There are various types of known IFF systems. Many of these systems use an active transmitter to transmit a coded signal query to a receiver unit. The receiver analyzes the coded signal query and, upon successful decoding and acknowledgment of the signal, an identifying coded response is sent back. The operational scenario behind this process is that only friendly objects can intelligibly recognize, decode and properly respond to these transmitted queries. If after a certain response time no reply to the query is forthcoming, the entity is presumed hostile and appropriate action can be taken.

For example, U.S. Pat. No. 5,355,241 discloses a retroreflector that operates at optical wavelengths and uses an active source for establishing a transmitting and receiving communication path to interrogate the system for data extraction. U.S. Pat. No. 5,539,565 discloses an optical retroreflector which operates in the visible wavelength spectrum and uses an interrogation and acknowledgment signaling process to respond with a transmitted code upon receiving an interrogation inquiry. The disclosures of these patents are hereby incorporated by reference in their entireties.

SUMMARY

The present invention is directed to a system for passively producing at least two distinct signal patterns. The system can be used for passively identifying friend or foe in an environment and operates in a hyper spectral mode that accommodates multiple bands simultaneously. Exemplary embodiments receive radiated energy within a resonant cavity, and use an absorber and a reflector to absorb and reflect desired frequencies of the incoming energy. A controller is connected to the IFF system and controls the switching back and forth between the absorber and the reflector to produce a signal having a desired data format. The encoded data can be used to determine the status of the candidate target.

Exemplary embodiments comprise a resonant cavity having an aperture for receiving radiated energy; an absorber and a reflector contained within the resonant cavity for receiving the radiated energy; and a controller to control switching of the absorber and the reflector to produce an identification signal data format. In exemplary embodiments, the signal patterns can be visible at multiple bands (e.g., radio frequency (RF), infrared (IR) and visible) simultaneously (i.e., hyper spectral). The aperture couples the resonant cavity to free space. The resonant cavity can be a waveguide for transmitting an incoming interrogating frequency. The aperture couples the waveguide to free space and also couples the resonant cavity to a lens assembly. The aperture couples the waveguide to a lens assembly.

The present invention utilizes radiated energy that is within at least one of radio, infrared and visible frequency spectrums. In exemplary embodiments, the distance between the aperture and the reflector is at least one half the wavelength of a lowest frequency of operation. The reflector can comprise a mirror, a prism, a diffraction grating or a Micro Electro Mechanical System (MEMS). A hermetically sealed container is used to house the resonant cavity, the absorber and reflector, and the controller.

BRIEF DESCRIPTION OF THE DRAWINGS

Objects and advantages of the invention will be understood by reading the following detailed description in conjunction with the following drawings.

DETAILED DESCRIPTION

Figure 1:
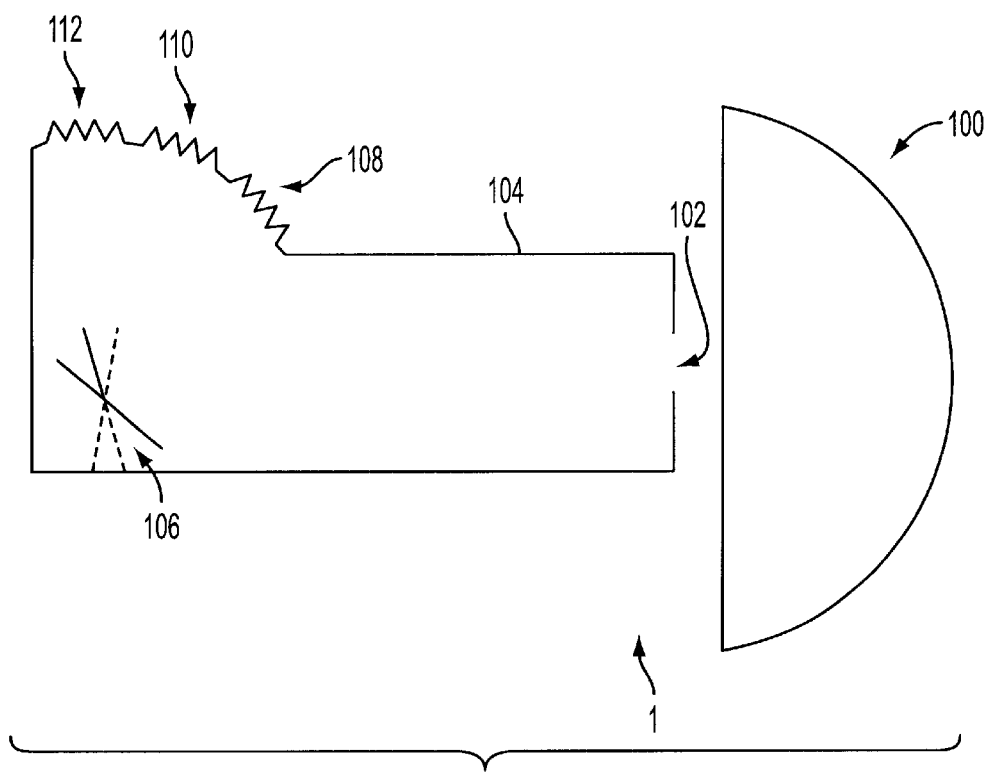
FIG. 1 illustrates an exemplary embodiment of the invention as viewed through the side of the device.

FIG. 1 illustrates an exemplary apparatus for passively producing at least two distinct signal patterns represented as a device 1. The FIG. 1 device can be configured as a hyper-spectral IFF. As referenced herein, the term hyper-spectral refers to the ability of a system to operate at multiple bands simultaneously. For example, exemplary embodiments of the present invention can operate in the RF, IR and visible spectrum simultaneously.

According to the exemplary system of FIG. 1, the device 1 includes a resonant cavity, such as resonant cavity 104, having an aperture for receiving radiated energy, along with the ability to transmit incoming radiation at different frequencies throughout the device. In the FIG. 1 example, an aperture 102 connects resonant cavity 104 with a lens assembly represented as a lens 100. A waveguide can be used in place of the resonant cavity as well as any structure or device that is capable of guiding electromagnetic waves along its length.

The FIG. 1 device also includes an absorber and a reflector contained within the resonant cavity for receiving the radiated energy. For example, the portion of the resonant cavity 104 located at an opposite end away from the lens has a movable and controllable reflector 106, such as a mirror for example, that is mounted on the inside of the resonant cavity 104. The degrees of freedom that the reflector can move through are determined by the range of movement required to direct the energy to a specific destination target within the cavity, such as one or more of the absorbers, 108, 110 and 112. Those skilled in the art will realize that the spatial orientation of the components within the cavity is governed by selecting any geometry that can receive and process incoming energy in the manner contemplated by this invention.

In addition to a mirror, the reflector can also be a polished metal mirror, a prism, a diffraction grating, a Micro Electro Mechanical System (MEMS), a faceted wheel, or any other device that can be envisioned to reflect or steer an energy beam onto the absorbers. These MEMS devices can include any number (e.g. hundreds or thousands) of micro-machined mirrors that can be used as a reflecting array. Many large projection television systems on the market use arrays of these micromachined reflectors. These MEMS devices can be a useful form of reflector because of their very low inertial mass. They can be manipulated very rapidly because of their low inertia and thereby handle the transmission of complex, high changing code. Another advantage of the MEMS surface is that it is made of metal (e.g. aluminum) and can reflect RF to UV wavelengths.

The movable reflector 106 can be positioned to reflect incoming radiation towards any one of or any combination of absorbers (e.g., absorber 108, 110 and/or 112 of the FIG. 1 embodiment). The reflection of incoming radiation energy onto the absorbers can occur at all of the desired operating bands. The FIG. 1 example includes absorber band 1 (108) associated with absorber band 2 (110) associated with absorber band 3 (112).

Figure 3:
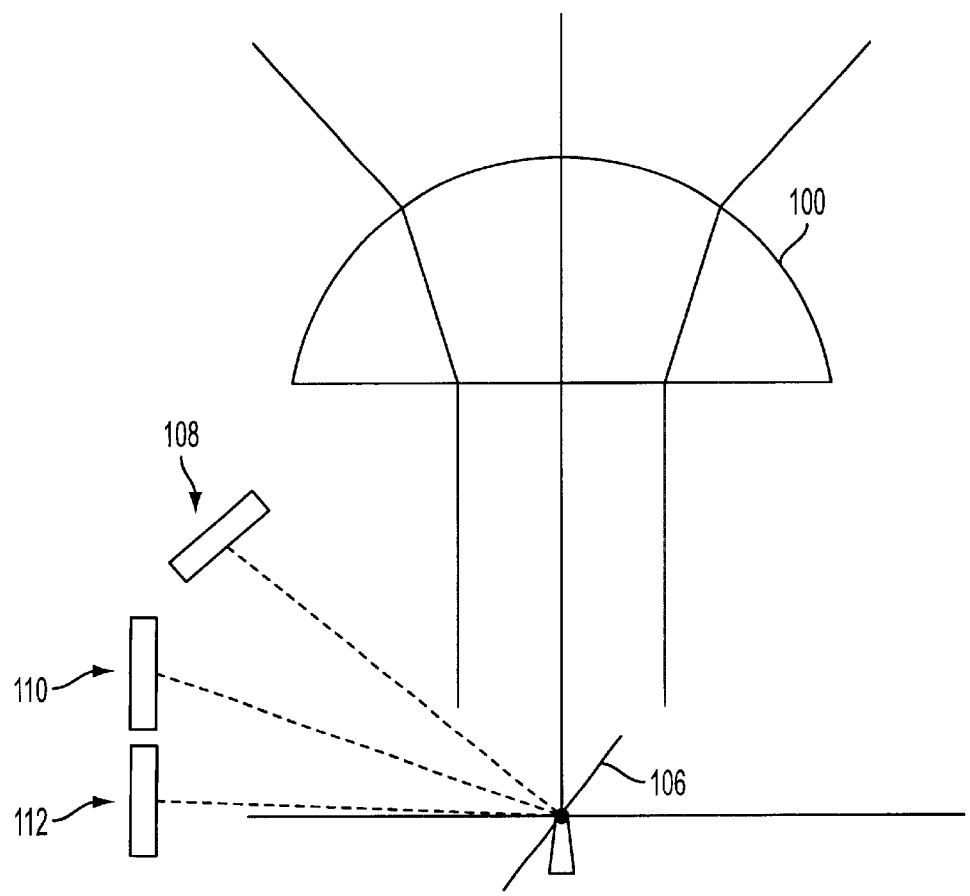
FIG. 3 is an exemplary illustration of the influx of energy entering into the cavity and its reflection onto the absorbers.

FIG. 3 is another view showing an exemplary internal reflection of the energy entering into the device. The movable reflector 106 can be positioned to reflect incoming radiation towards any one or more of absorber band 1 (108), absorber band 2 (110), and absorber band 3 (112). The quantity and material used for the absorbers can, for example, be governed by levels of energy to be absorbed. Different absorber materials have varying characteristics and levels of absorption. Different materials emit and absorb light most efficiently at specific wavelengths or wavelength ranges.

In operation, an observer or observing device directs energy towards the IFF device. The pointing angle of the observer directing energy towards the device is not critical, because the selection of a lens 100 having broad scatter characteristics can provide a correspondingly broad scatter pattern into the resonant cavity to accommodate the wide range of incident angles that incident energy could potentially enter the device. This system can accommodate a wide range of frequencies. For example, the energy can be in the form of visible light, RF, infrared, etc. The energy passes through the lens 100 and the aperture 102 into the resonant cavity 104, to the movable reflector 106 and then is deflected onto one or more of the absorbers (108, 110, 112).

Different (e.g., higher) frequencies of incoming energy will stimulate different (e.g., higher) order modes of excitation response in the resonant cavity. Lower frequencies of energy entering the cavity will excite lower response modes in the cavity, while middle frequencies of energy will excite intermediary response modes in the cavity. Since many absorbers do not always possess broad band properties that allow them to accommodate wide bands of the energy spectrum, the system can be optionally configured with two or more absorbers of different materials and absorption characteristics in the resonant cavity to support these broader bands and achieve the requisite absorption rate. The desired response characteristics of the system can be adjusted depending upon the specific absorber band material selection and controlling how the reflector directs the reflected energy to the absorber or absorbers. Thus, the deflection and the resultant absorption of the incoming energy changes the characteristics of the modes of reflection set up in the resonant cavity.

A sweeping movement of the reflecting device 106 sweeping back and forth within the resonant cavity can be used to cause the different absorbers (108, 110, 112) to be placed in the path of the reflected energy. As this occurs, the various absorbers absorb different quantities of energy, with the result that the overall reflectivity of the device changes in a variable manner to an outside observer, depending on the levels of reflection or absorption of energy within the resonant cavity. In one exemplary embodiment, an observer will see an overall strong reflection when the resonant cavity is in the reflection mode, and will see an overall lossy or attenuated reflection when the resonant cavity is in an absorb mode.

Figure 2:
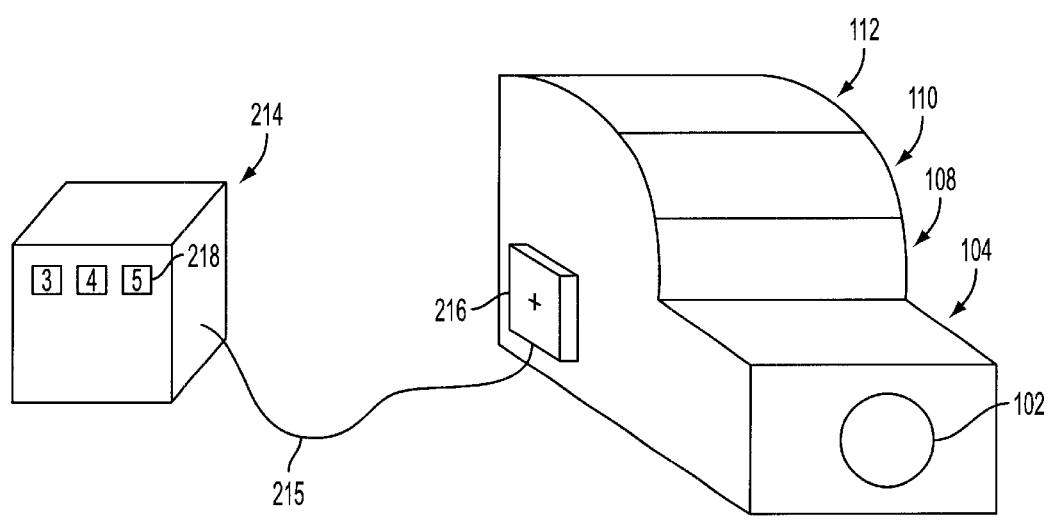
FIG. 2 illustrates an exemplary embodiment of the invention when viewed from a frontal view with the lens removed and the aperture exposed.

The ability to control the reflectivity of the device is the mechanism that encodes or modulates the data content and allows the information to be carried back to an observer. FIG. 2 illustrates an exemplary control mechanism used to encode the data. In the FIG. 2 example, a controller 214, which can be any hardware and/or software device, controls the switching of the absorber and the reflector to produce an identification signal data format. For example, controller 214 controls the motion of the reflector and is connected 215 to an interface 216 shown attached to the outer surface of the resonant cavity 104. The controller can include an interface (e.g., keyboard), display (e.g, CRT or monitor) and internal and/or external memory to support program operations, such as control and storage.

In this exemplary system, both the controller 214 and the interface 216 are shown external to the resonant cavity. However, the controller and the interface could alternately be placed anywhere in the system, including locations internal to the resonant cavity 104. The interface 216 can be implemented in any of numerous ways, such as a mechanical switcher, an electric switcher, an electromechanical switcher, or any combination thereof. In one exemplary embodiment, the interface 216 can be a mechanical switcher that uses a rotary motor that responds to drive signals from the controller 214 to drive an output shaft connected to the reflector 106 that can be rotatably mounted within the device 1. In alternate embodiments, the absorber can be driven, or both the reflectors and the absorbers can be driven.

The controller 214 can be programmed to encode information so that the reflected energy contains a recognizable data format that an external observer can decode and understand. This data format can be used for identifying whether the source producing the data is a friend or foe. The program that runs the controller 214 can be programmed in any language and the program can be implemented in different media, such as software, firmware, flash programmable memory and so forth.

The controller 214 can provide a great deal of system flexibility and increased battlefield security. It allows for an easy update of the coded data format on a periodic basis or in response to any other type of countermeasure encountered in the field or in any potential decryption or compromise of the code. Thus, exemplary embodiments can provide a high level of user programmability, field flexibility and ability to work at all frequencies.

The following example illustrates one possible performance scenario of the present invention operating at a selected frequency. Usually, most RF absorbers are black or darker in color, while most RF reflectors are lighter or shiny. Therefore, at optical band frequencies, when the incoming RF energy enters the device and impinges on the absorbers in a predetermined manner controlled by the controller and effectuated by the mechanical positioner, the observer that is querying the IFF system will see an output from the device that will appear as a blinking pattern alternating between bright and dark. The pattern and rate blinking will be recognizable to one that knows how to interpret the coded information returned from the system. The return information can be further protected by requiring an IR or night vision detection system to read the information. If the code pattern is recognized, the target will not be fired upon. Conversely, if the code emanating from the target is not recognized or does not exist, the target will be perceived as a hostile threat and a firing decision can be made on that basis.

In FIG. 2, the controller 214 has an appropriate code 218 that is selected for a given system in a specific application. The code 218 is represented as a three digit display in FIG. 2. The code can also be represented by any number of numeric or alphanumeric permutations. This code can be selected to be slower than the pulse repetition frequency (PRF) of the observing systems. A radar signal processor or system operator can resolve friend or foe information from the signals that are reflected from the device 1 by distinguishing a return that is varying in a known and recognizable manner. This determination can then be reported to a computer, a fire control officer or a commanding field authority. In FIG. 2, an interface 216 is shown on the exterior of device 1 and connected to the controller 214 by a cable 215. The interface can be any type of electrical, mechanical or electromechanical transducer to transfer the input of an exemplary controller to a mechanism for controlling the reflector. The cable 215 can be any type of electrical or mechanical connection to effect actuation of the reflectors. The cable 215 could also be implemented by a wireless link (e.g., RF).

In exemplary embodiments, the distance from the aperture 102 to the reflector 106 can be at least one half the wavelength of the lowest frequency with which the system is to be used, although those skilled in the art can select this distance in any desired manner. In one example, for X-band frequencies (10 Ghz), the selected distance can be approximately 6 inches, or lesser or greater.

The radar cross section of this device can be sized to the order of the major scatterers found in the ambient environment or it can be sized to the specific platform being detected, or in accordance with any desired criteria. Exemplary embodiments are passive, in that they emitno additional signals that are not already present in the surrounding environment.

Exemplary embodiments can be extended to any frequency spectrum desired, such as the infrared and visible bands by, for example, material selection. For example, materials such as Polystyrene and Zinc Sulfide can be used to fabricate lenses that have acceptable transmission properties at the RF, IR and visible bands. One example of a lens material is CLEARTRAN™. This material, which is a water-clear form of Zinc Sulfide, has low absorption and scatter characteristics throughout the breadth of its broad transmitting range. It can be used for multi-spectral applications that use a single aperture or beam path for several wavebands.

Lens systems used in accordance with exemplary embodiments can, but need not, possess good focusing properties. Exemplary embodiments use lens systems to broaden the aperture and facilitate target acquisition. The ability to receive energy in a broad manner at various angles of incidence permits exemplary embodiments of the present invention to be placed on any portion or location of the target and still obtain a system response, since the observer to direct the energy towards the system with a high level of directional accuracy.

Exemplary IFF systems in accordance with the present invention can be mounted in various locations on any type of platform. Some examples of systems that could benefit from the present invention would be tanks, armored personnel carriers, automobiles, helicopters, ships, aircraft, and so forth. The present invention can also be configured to work in an underwater or space environment by using, for example, a hermetically sealed container.

The external housing and its overall form factor can be varied as desired to accommodate aerodynamic, hydrodynamic, environmental and/or any other considerations without changing the scope of the invention.

The present invention has been described with reference to a preferred embodiment. However, it will be readily apparent to those skilled in the art that it is possible to embody the invention in specific forms other than that described above, and that this may be done without departing from the spirit of the invention. The preferred embodiments above are merely illustrative and should not be considered restrictive in any way. The scope of the invention is given by the appended claims, rather than the preceding description, and all variations and equivalents which fall within the range of the claims are intended to be embraced therein.

What is claimed is:

1. An apparatus for passively producing at least two distinct signal patterns comprising:
   a resonant cavity having an aperture for receiving radiated energy;
   an absorber and a reflector contained within the resonant cavity for receiving the radiated energy; and
   a controller to control at least one absorber and reflector to produce an identification signal data format.

2. The apparatus as claimed in claim 1, wherein the aperture couples the resonant cavity to free space.

3. The apparatus as claimed in claim 1, wherein the resonant cavity is a waveguide for transmitting an incoming frequency.

4. The apparatus as claimed in claim 1, wherein the aperture couples the resonant cavity to a lens assembly.

5. The apparatus as claimed in claim 1, wherein the aperture couples the waveguide to a lens assembly.

6. The apparatus as claimed in claim 1 wherein the radiated energy is within at least one of radio, infrared and visible frequency spectrums.

7. The apparatus as claimed in claim 1, wherein the distance between said aperture and the reflector is at least one half the wavelength of a lowest frequency of operation.

8. The apparatus as claimed in claim 1, wherein the reflector comprises a mirror.

9. The apparatus as claimed in claim 1, wherein the reflector comprises a prism.

10. The apparatus as claimed in claim 1, wherein the reflector comprises a diffraction grating.

11. The apparatus as claimed in claim 1, wherein the reflector comprises a Micro Electro Mechanical System (MEMS).

12. The apparatus as claimed in claim 1, comprising:
   a hermetically sealed container to house the resonant cavity, the absorber and reflector, and the controller.

13. The apparatus as claimed in claim 3, wherein said aperture couples the waveguide to free space.

* * * * *